Aug. 14, 1928.

E. W. HARELIK 1,680,986

EXPANSIBLE BRAKE

Filed Aug. 4, 1926

Inventor

Ely W. Harelik,

By

Attorneys

Patented Aug. 14, 1928.

1,680,986

UNITED STATES PATENT OFFICE.

ELY W. HARELIK, OF DETROIT, MICHIGAN.

EXPANSIBLE BRAKE.

Application filed August 4, 1926. Serial No. 127,011.

This invention relates to automatic slack adjusters and more particularly to a slack adjuster adapted for use in connection with the brake mechanism of automotive vehicles.

Certain objects of the invention are to provide a simple and inexpensive device for the purpose which is automatic in its adjustment, is easy to install in any of the well known types of brakes, and is efficient in compensating for the wear of the friction surfaces of the brake.

Other objects of the invention will appear hereinafter.

In the drawing.

Like numerals of reference refer to corresponding parts.

Figure 1:
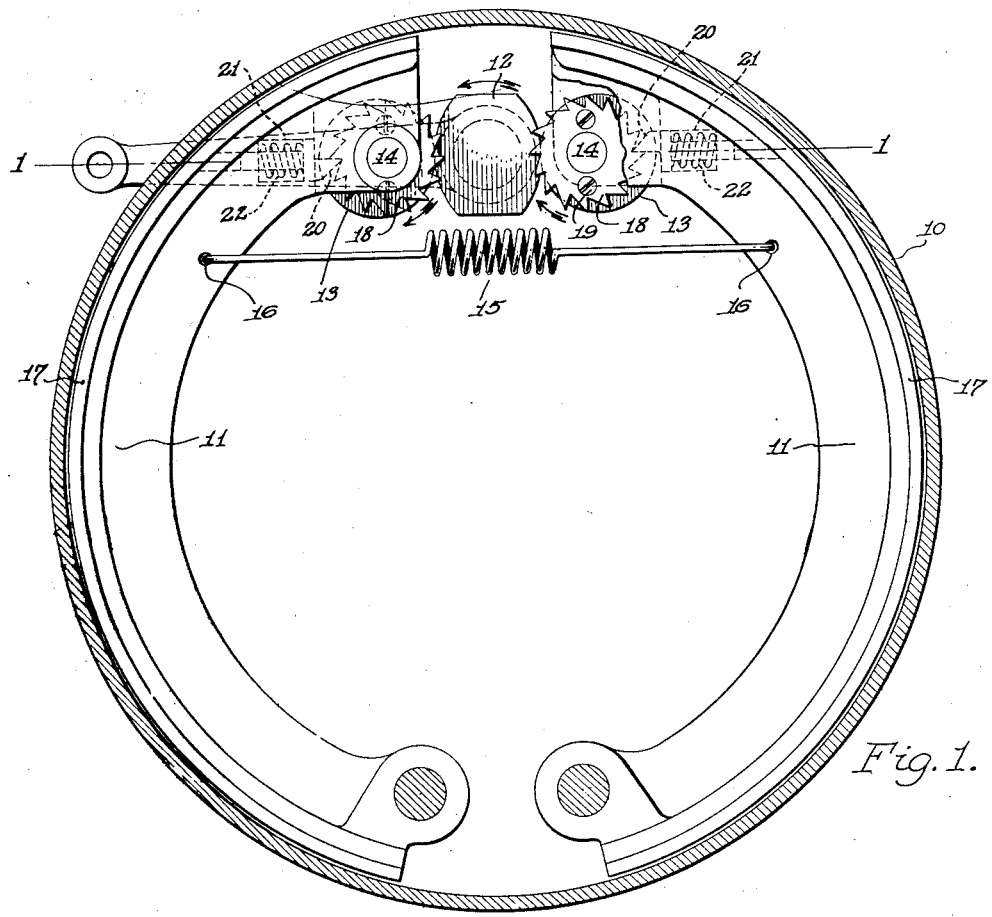
Figure 1 is an elevational view of a brake mechanism showing the interior operating part and the application of the automatic slack adjuster thereto.
Figure 2:
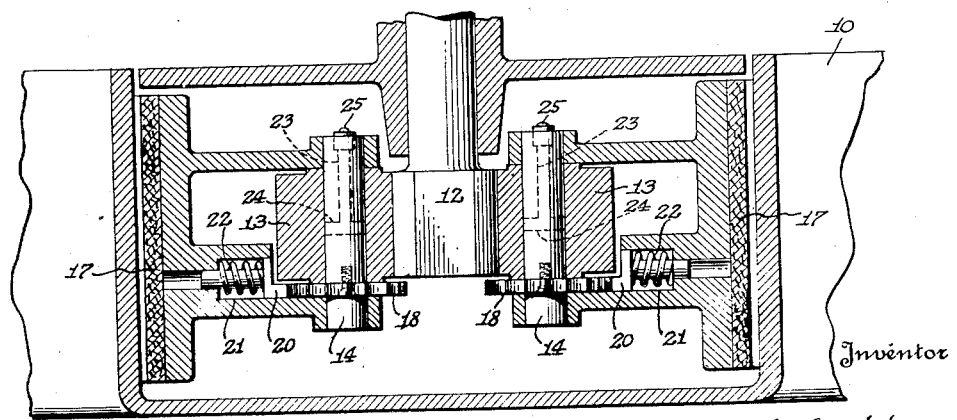
Fig. 2 is a horizontal sectional view taken on the line 1—1 of Fig. 1.

Referring to the drawing:—the numeral 10 designates a brake drum provided with the usual pivoted brake bands or shoes 11 and operating cam 12.

Eccentric cylinders 13 are rotatably fastened by pins 14 to the upper free ends of the brake shoes, and are so arranged as to engage the cam 12. A spring 15 hooked into openings 16 of the brake shoes normally maintains said eccentrics in engagement with the cam, while serving at the same time, of course, to keep the brake shoe and brake lining 17 clear of the side of the brake drum. Ratchets 18 are formed integral with or suitably secured to the eccentrics, as by screws 19. Co-operating pawls 20 are provided which are housed in suitable recesses 21 formed in the brake shoes, and are urged outwardly by coil springs 22.

The pins 14 are formed with central bores 23 across which are formed one or more transverse holes 24 for the distribution of a lubricant. In one end of the pin a grease cup 25 may be conveniently provided.

In operation, as the cam 12 is actuated by the brake rod (not shown) connected to a lever arm on the end of the shaft of cam 12 and moves in the direction of the arrow, the eccentrics 13 are forced in opposite directions by the cam and swing the shoes upon which they are mounted, thereby bringing the brake lining 17 into frictional engagement with the brake drum 10. The rubbing engagement of the cam against the eccentric 13 causes the latter to rotate slightly in the direction of the arrows shown in the drawing which rotation tends to move the shoes still further apart. This feature in the operation of the brake is of great value for it reduces the angular movement of the cam and compensates for wear of the brake lining—maintaining the adjustment at approximately its most efficient position.

When wear of the brake lining becomes excessive and the eccentrics are rotated, by the turning of the cam in contact therewith, a distance greater than the spacing of the teeth of the ratchets 18 which turn with the eccentrics, a tooth of each ratchet will slip past the pawls 20, and these pawls will then hold the eccentrics in this rotatively adjustable position relative to their normal line of contact with the cam, that is the side of greatest eccentricity will be adjusted toward the cam, thereby taking up the lost motion until further wear permits of further rotation of said eccentrics sufficient to permit the pawls to pass the next adjacent tooth of each ratchet, where further adjustment and take-up will occur. With the wear thus compensated, cam 12 will have the same angular movement as it had prior to the wear of the brake lining.

From the foregoing it will be seen that there is provided a simple inexpensive slack adjuster which is efficient in operation, and provides a most satisfactory automatic means of self adjustment of the brakes.

Modifications of the construction as shown are contemplated and may be made within the spirit of the invention and the scope of the appended claims.

What I claim is:—

1. In a brake, the combination with a drum, friction members in said drum, and a cam for operating said friction members, of variable spacers between said cam and friction members, said spacers being adjusted by the engagement of said cam therewith to automatically vary the effect of said cam in operating said friction members.

2. In a brake, the combination with a drum, friction members in said drum, and a cam operating said friction members, of rotatable spacers carried by said members and rotated by the engagement of said cam, therewith to adjust said spacers relative to said cam and members.

3. In a brake, the combination with a drum, friction members pivotally supported at one end within said drum and a cam member between the opposite ends of said friction members, of members rotatively mounted upon the ends of said friction members to be engaged by said cam, said members having eccentric portions to be brought into position to be engaged by said cam by a rotative movement of said members.

4. A brake mechanism as characterized in claim 3 and including means for adjusting said members upon said friction members, rotatively and holding the same in adjusted position.

5. A brake mechanism as characterized in claim 3 and wherein said members upon the ends of said friction members are arranged to be rotated in one direction only by the engagement of said cam therewith.

6. A brake mechanism as characterized in claim 3 and wherein said members on the ends of said friction members are rotated in one direction by the engagement of said cam therewith and a pawl and ratchet are associated with each member to prevent rotation in a direction reverse to that in which they are rotated by said cam.

7. Slack adjusting means for brakes having pivoted friction members adapted to be brought into contact with a brake drum by a cam, said adjusting means including an eccentric rotatively mounted upon each of said friction members to be engaged by said cam, and means associated with each of said eccentrics for permitting rotation thereof in one direction only.

8. In combination with a brake drum, friction shoes pivotally mounted in said drum, and a cam interposed between the ends of said shoes, of eccentric members rotatively mounted upon the ends of said shoes to be engaged by said cam and rotatively adjusted in one direction by the engagement of said cam therewith, and means carried by said shoes to prevent rotation of said eccentrics in one direction and permit free rotation in the direction in which they are turned by the engagement of said cam therewith in operating the brake.

In testimony whereof I affix my signature.

ELY W. HARELIK.